(12) United States Patent
Cody et al.

(10) Patent No.: US 7,448,809 B2
(45) Date of Patent: Nov. 11, 2008

(54) ANGLE-SPECIFIC MULTI-FIBER FERRULES AND ASSOCIATED METHODS OF MANUFACTURE

(75) Inventors: Joseph Todd Cody, Hickory, NC (US); David Lee Dean, Jr., Hickory, NC (US); Alan John Malanowski, Hickory, NC (US); Scott Timothy Schmidt, Hickory, NC (US)

(73) Assignee: Corning Cable Systems, LLC, Hickory, NC (US)

( * ) Notice: Subject to any disclaimer, the term of this patent is extended or adjusted under 35 U.S.C. 154(b) by 0 days.

(21) Appl. No.: 11/712,036

(22) Filed: Feb. 28, 2007

(65) Prior Publication Data

US 2008/0205824 A1 Aug. 28, 2008

(51) Int. Cl.
*G02B 6/38* (2006.01)
(52) U.S. Cl. .................... 385/59; 385/60; 385/63; 385/72; 385/76; 385/77; 385/78; 264/1.24; 264/1.25; 356/73.1; 65/385; 65/408
(58) Field of Classification Search .................... 385/59, 385/60, 63, 72, 76–78; 264/1.24, 1.25; 65/385, 65/408; 356/73.1
See application file for complete search history.

(56) References Cited

U.S. PATENT DOCUMENTS

| | | | |
|---|---|---|---|
| 5,214,730 A * | 5/1993 | Nagasawa et al. | 385/59 |
| 6,663,377 B1 | 12/2003 | Dean et al. | 425/190 |
| 6,761,489 B1 | 7/2004 | Dean et al. | 385/78 |
| 6,767,199 B2 | 7/2004 | Dean et al. | 425/192 |
| 7,156,561 B2 * | 1/2007 | Patel et al. | 385/59 |
| 7,261,469 B1 * | 8/2007 | Dean et al. | 385/60 |

OTHER PUBLICATIONS

Suematsu et al. ("Super Low-Loss, Super High-Density Multi-Fiber Optical Connectors," Furukawa Review, No. 23, pp. 53-58, 2003).*
Ohtsuka et al. ("Development of Multi-Fiber Optical Connector Using High-Density Optical Circuit," SEI Technical Review, No. 56, pp. 14-20, Jun. 2003).*

* cited by examiner

*Primary Examiner*—Brian Healy
*Assistant Examiner*—Hung Lam
(74) *Attorney, Agent, or Firm*—Gregory V. Bean; Michael E. Carroll (57) ABSTRACT

The present invention provides a method of manufacture that minimizes the lateral offset of a plurality of optical fiber holes associated with a multi-fiber ferrule, including: determining an initial offset distance of each of the plurality of optical fiber holes from each of a plurality of corresponding target locations on an initial endface; removing a predetermined amount of material from the multi-fiber ferrule to form a subsequent endface; determining a subsequent offset distance of each of the plurality of optical fiber holes from each of the plurality of corresponding target locations on the subsequent endface; and, using the initial offset distance and the subsequent offset distance, determining an angle of each of the plurality of optical fiber holes relative to the initial endface. The method of manufacture also includes, using the angle, determining an optimal amount of material that is removed from the multi-fiber ferrule in order to minimize the offset distance of the plurality of optical fiber holes from the plurality of corresponding target locations. The method of manufacture further includes, using the optimal amount of material, removing this amount of material from another similarly-situated multi-fiber ferrule.

18 Claims, 8 Drawing Sheets

ANGLE-SPECIFIC MULTI-FIBER FERRULES AND ASSOCIATED METHODS OF MANUFACTURE

BACKGROUND OF THE INVENTION

1. Field of the Invention

The present invention relates generally to multi-fiber (MF) ferrules used to connect optical fibers and devices within optical communications networks. More specifically, the present invention relates to angle-specific, lateral offset-optimized MF ferrules and associated methods of manufacture.

2. Technical Background of the Invention

A conventional MF ferrule includes two guide pin holes or bores and a plurality of optical fiber holes or bores that are disposed substantially between the two guide pin holes. Two MF ferrules are assembled together and optically coupled using two guide pins that are disposed in the two guide pin holes of each of the MF ferrules, aligning the plurality of optical fiber holes and corresponding plurality of optical fibers. The same mechanism is often used to assemble together and optically couple an MF ferrule and a device. The alignment of each of the optical fiber holes from one MF ferrule to another, or from one MF ferrule to a device, is critical in order to achieve low insertion or connectivity loss. The farther the plurality of optical fiber holes are from their desired target locations, due to manufacturing tolerances, for example, the higher the insertion loss. In general, a 1.3 µm radial offset for one MF ferrule is considered to be acceptable. This is true for MF ferrules with both flat and pre-angled (8-degree) endfaces.

As of yet, there is an unresolved need for methods of manufacture that minimize the lateral offset of the plurality of optical fiber holes associated with MF ferrules. This problem is exacerbated by the fact that, as optical fiber and ferrule materials are removed from the endface of an MF ferrule, such as during polishing, for example, this lateral offset often changes, both in degree and potentially direction, becoming more or less pronounced in an unpredictable manner. This is caused by the fact that, due to manufacturing tolerances, for example, each of the optical fiber holes may be angled with respect to the endface of the MF ferrule. The methods of manufacture that minimize the lateral offset of the plurality of optical fiber holes associated with the MF ferrule should take advantage of this lateral offset change.

BRIEF SUMMARY OF THE INVENTION

In various embodiments, the present invention provides methods of manufacture that minimize the lateral offset of the plurality of optical fiber holes associated with an MF ferrule. These methods of manufacture take advantage of the lateral offset change described above, considering the position of the plurality of optical fiber holes before and after optical fiber and ferrule materials are removed from the endface of the MF ferrule, such as during polishing, for example. It should be noted that "gapping" or "tilting" also increases insertion loss, but is not specifically addressed by the methods of manufacture of the present invention (although they may have advantageous effects related thereto). As used herein, "MF ferrule" refers variously to 2f, 4f, 8f, 12f, 24f, 32f, 48f, 72f, etc. ferrules. Application to single-fiber (1f) ferrules is also contemplated herein.

In one embodiment, the present invention provides a method of manufacture that minimizes the lateral offset of a plurality of optical fiber holes associated with a multi-fiber ferrule, including: determining an initial offset distance of an optical fiber hole from a target location in one or more directions on an initial endface of a multi-fiber ferrule; removing a predetermined amount of material from the multi-fiber ferrule to form a subsequent endface of the multi-fiber ferrule; determining a subsequent offset distance of the optical fiber hole from the target location in the one or more directions on the subsequent endface of the multi-fiber ferrule; and, using the initial offset distance of the optical fiber hole and the subsequent offset distance of the optical fiber hole, determining an angle of the optical fiber hole relative to the initial endface of the multi-fiber ferrule. The method of manufacture also includes, using the angle of the optical fiber hole, determining an optimal amount of material that is removed from the multi-fiber ferrule in order to minimize the offset distance of the optical fiber hole from the target location. The method of manufacture further includes, using the optimal amount of material that is removed from the multi-fiber ferrule, removing this amount of material from another similarly-situated multi-fiber ferrule.

In another embodiment, the present invention provides a method of manufacture that minimizes the lateral offset of a plurality of optical fiber holes associated with a multi-fiber ferrule, including: determining an initial offset distance of each of a plurality of optical fiber holes from each of a plurality of corresponding target locations in one or more directions on an initial endface of a multi-fiber ferrule; removing a predetermined amount of material from the multi-fiber ferrule to form a subsequent endface of the multi-fiber ferrule; determining a subsequent offset distance of each of the plurality of optical fiber holes from each of the plurality of corresponding target locations in the one or more directions on the subsequent endface of the multi-fiber ferrule; and, using the initial offset distance of each of the plurality of optical fiber holes and the subsequent offset distance of each of the plurality of optical fiber holes, determining an angle of each of the plurality of optical fiber holes relative to the initial endface of the multi-fiber ferrule. The method of manufacture also includes, using the angle of each of the plurality of optical fiber holes, determining an optimal amount of material that is removed from the multi-fiber ferrule in order to minimize the offset distance of the plurality of optical fiber holes from the plurality of corresponding target locations. The method of manufacture further includes, using the optimal amount of material that is removed from the multi-fiber ferrule, removing this amount of material from another similarly-situated multi-fiber ferrule.

In a further embodiment, the present invention provides a multi-fiber ferrule formed by a method of manufacture, comprising: determining an initial offset distance of an optical fiber hole from a target location in one or more directions on an initial endface of a test multi-fiber ferrule; removing a predetermined amount of material from the test multi-fiber ferrule to form a subsequent endface of the test multi-fiber ferrule; determining a subsequent offset distance of the optical fiber hole from the target location in the one or more directions on the subsequent endface of the test multi-fiber ferrule; and, using the initial offset distance of the optical fiber hole and the subsequent offset distance of the optical fiber hole, determining an angle of the optical fiber hole relative to the initial endface of the test multi-fiber ferrule. The method of manufacture also includes, using the angle of the optical fiber hole, determining an optimal amount of material that is removed from the multi-fiber ferrule in order to minimize the offset distance of the optical fiber hole from the target location. The method of manufacture further includes, using the optimal amount of material that is removed from the multi-fiber ferrule, removing this amount of material from the multi-fiber ferrule.

It is to be understood that both the foregoing general description and the following detailed description provide exemplary embodiments of the present invention, and an overview or framework for understanding the nature and character of the present invention as it is claimed. The accompanying drawings are included in order to provide a further understanding of the present invention, and are incorporated into and constitute a part of this specification. The accompanying drawings illustrate the various exemplary embodiments of the present invention, and together with the detailed description, serve to explain the principles of operation thereof. The accompanying drawings are meant to be illustrative, and not limiting.

BRIEF DESCRIPTION OF THE DRAWINGS

The present invention is illustrated and described herein with reference to the various drawings, in which like reference numbers are used to denote like method steps and/or device components, as appropriate, and in which.

DETAILED DESCRIPTION OF THE INVENTION

In various embodiments, the present invention provides methods of manufacture that minimize the lateral offset of the plurality of optical fiber holes associated with an MF ferrule. These methods of manufacture take advantage of the lateral offset change described above, considering the position of the plurality of optical fiber holes before and after optical fiber and ferrule materials are removed from the endface of the MF ferrule, such as during polishing, for example. Again, it should be noted that "gapping" or "tilting" also increases insertion loss, but is not specifically addressed by the methods of the present invention (although they may have advantageous effects related thereto).

Figure 1:
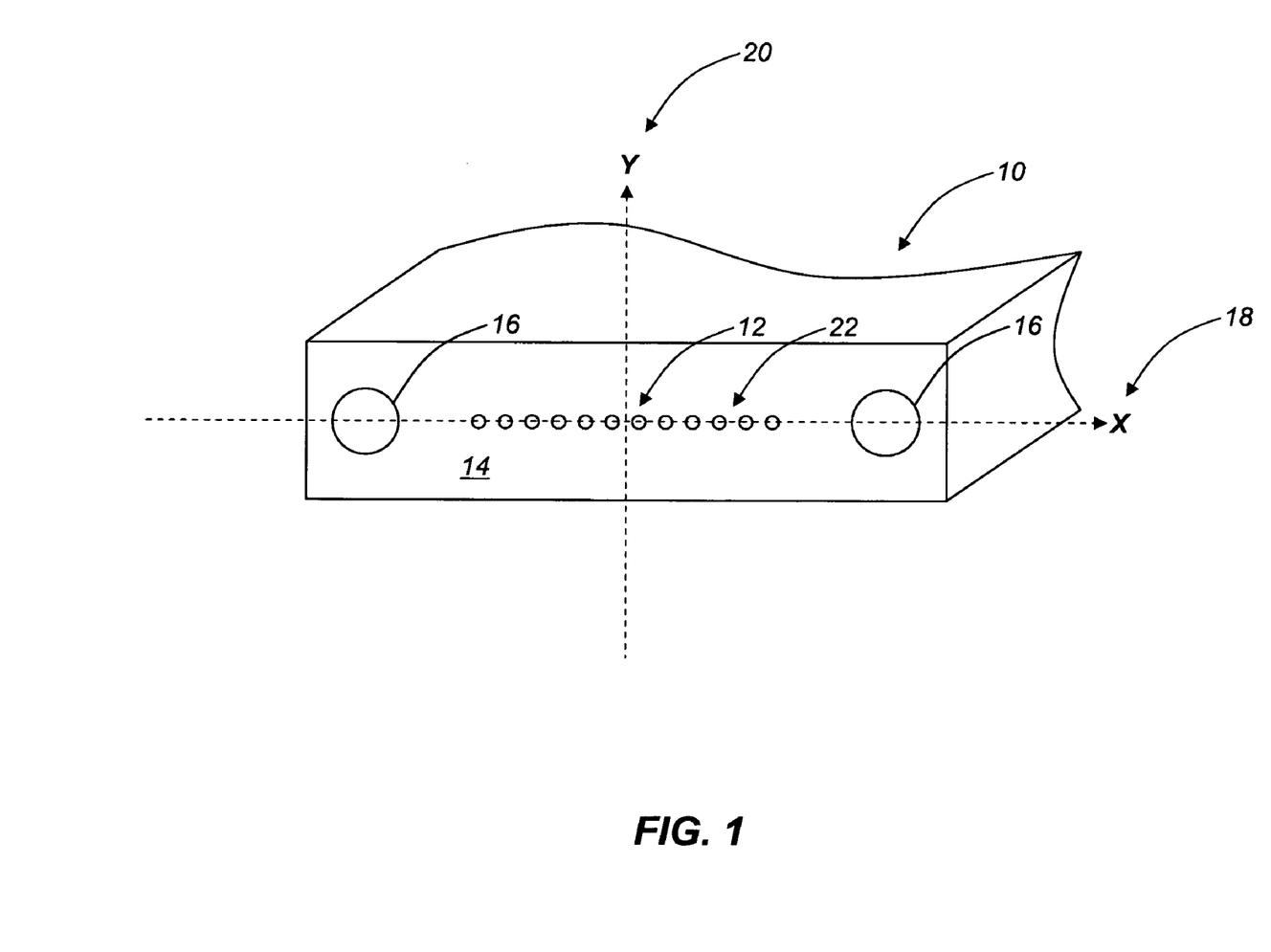
FIG. 1 is a perspective view of the endface of an MF ferrule that includes two guide pin holes and a plurality of optical fiber holes that are disposed substantially between the two guide pin holes, the perspective view including an overlaid graph.

Referring to FIG. 1, given an MF ferrule 10, the center 12 of the endface 14 between the two guide pin holes 16 (and, specifically, between the centers of the two guide pin holes 16) is selected as the origin 12 of the X-axis 18 and Y-axis 20 of the endface 14. The target location 24 (FIGS. 2-4) of each of the optical fiber holes 22 is measured along the X-axis 18 and Y-axis 20. This hypothetical distance of each of the optical fiber holes 22 from the origin 12 along the X-axis 18 and Y-axis 20 represents the target X-offset and Y-offset of each of the optical fiber holes 22, respectively. In an ideal case, the target X-offset for each of the optical fiber holes 22 is a predetermined value, while the target Y-offset for each of the optical fiber holes 22 is zero (i.e., the optical fiber holes 22 lie substantially along the X-axis 18).

Figure 2:
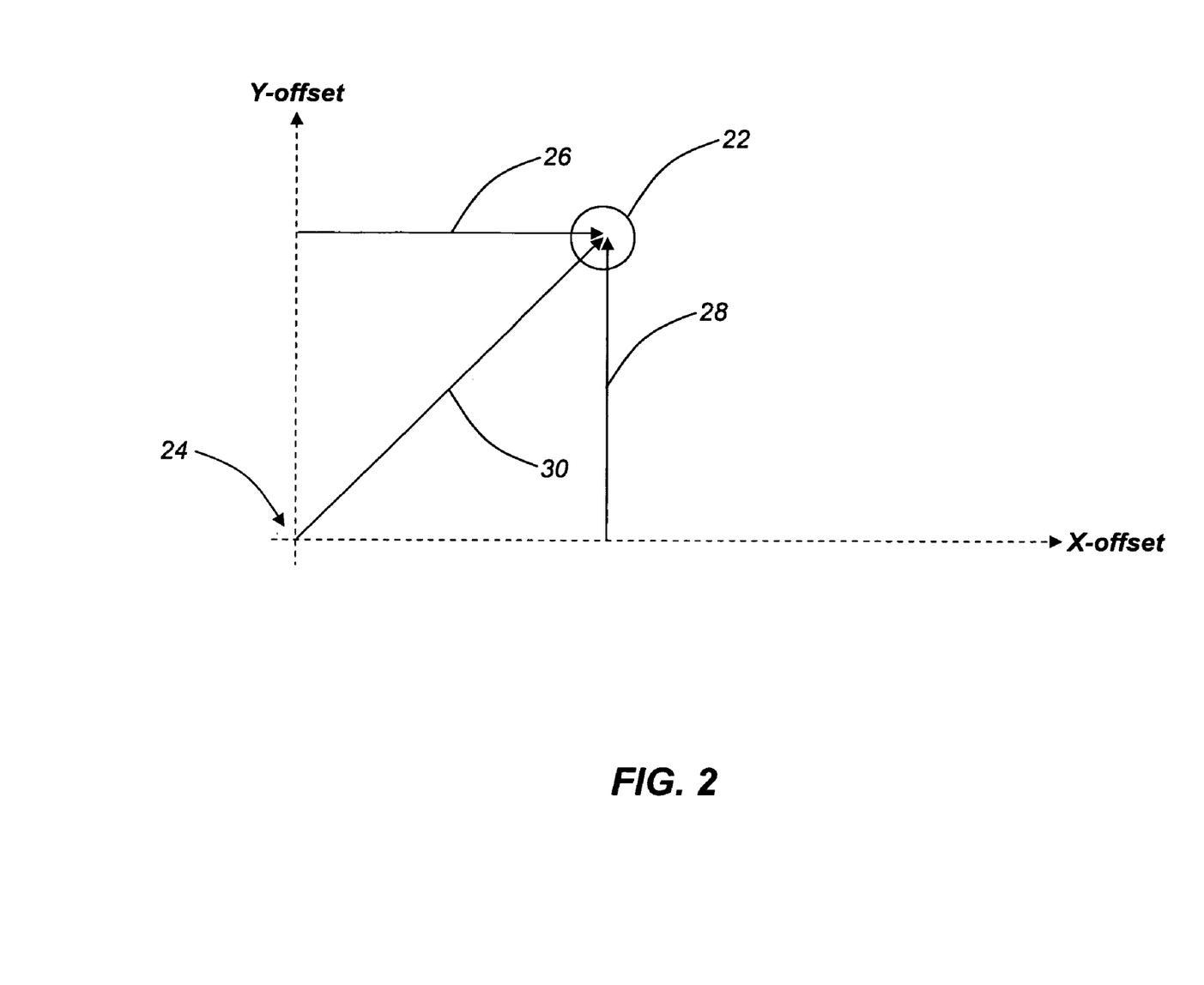
FIG. 2 is an isolated view of a portion of the overlaid graph of FIG. 1, illustrating the determination of the radial offset of a given optical fiber hole.

Referring to FIG. 2, the distance of each of the optical fiber holes 22 from the target location 24 of each of the optical fiber holes 22 along the X-axis 18 (FIG. 1) and Y-axis 20 (FIG. 1) represents the observed X-offset 26 and Y-offset 28 of each of the optical fiber holes 22, respectively. The observed X-offset 26 and Y-offset 28 are used to calculate the radial offset 30 of the corresponding optical fiber hole 22, indicating where the optical fiber hole 22 actually is in relation to where it should be. This initial radial offset 30 is calculated for each of the optical fiber holes 22. The optical fiber hole 22 with the greatest radial offset 30 establishes the maximum radial offset (RMAX). RMAX is used to determine whether a given MF ferrule 10 (FIG. 1) is initially within or outside of specification with respect to optical fiber hole location. Other specifications must be met as well, including guide pin hole location, hole diameter, etc.

Once the MF ferrule 10 (FIG. 1) is assembled with the plurality of optical fibers and related hardware, the endface 14 (FIG. 1) of the MF ferrule 10 is polished in order to remove excess optical fiber and endface materials and provide an acceptable mating surface. Typically, about 50 μm of optical fiber and ferrule materials are removed from the endface 14. As these optical fiber and ferrule materials are removed from the endface 14, the lateral offset (and the corresponding insertion loss) of each of the optical fiber holes 22 often changes, both in degree and potentially direction, becoming more or less pronounced in an unpredictable manner. This is caused by the fact that, due to manufacturing tolerances, for example, each of the optical fiber holes 22 may be angled with respect to the endface 14 of the MF ferrule 10.

Figure 3:
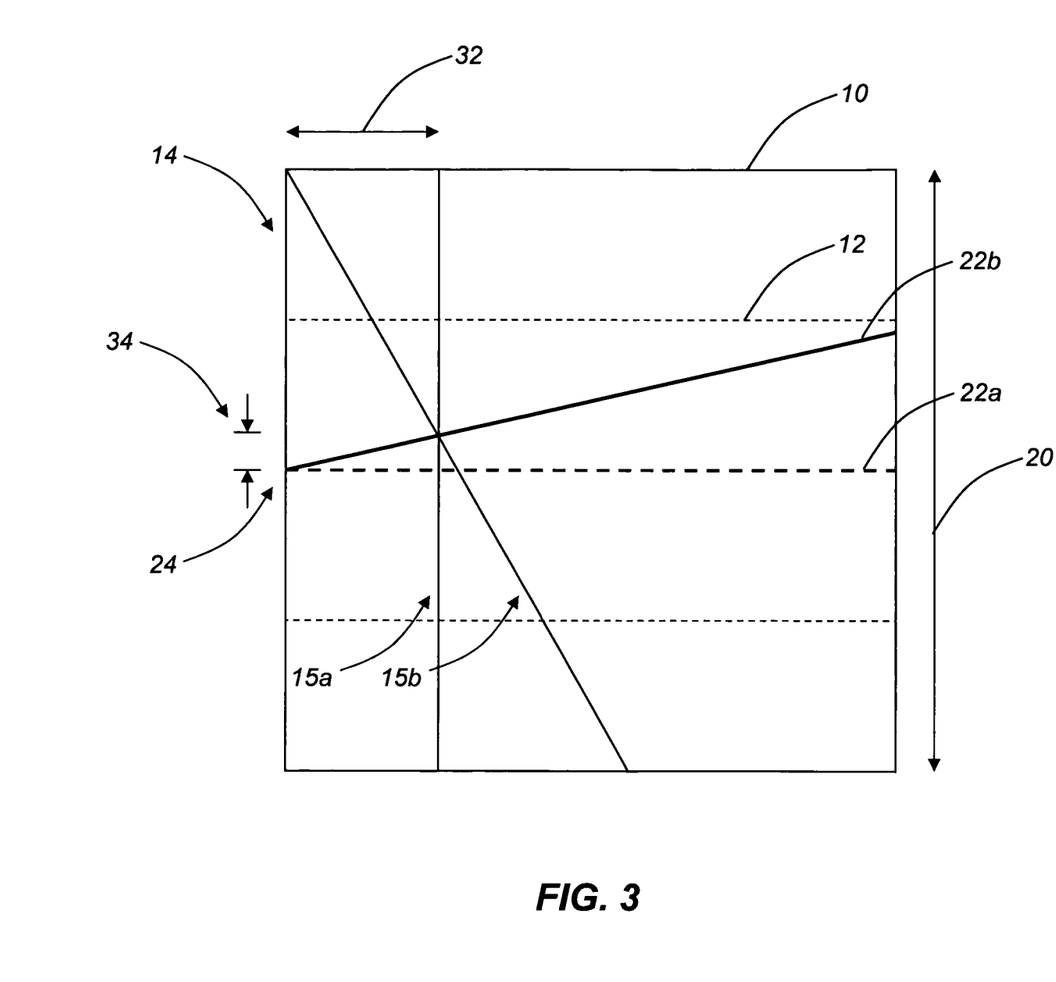
FIG. 3 is a cross-sectional side view of an illustrative MF ferrule that includes a single guide pin hole and a single optical fiber hole, illustrating the lateral offset change of the optical fiber hole that occurs during the polishing process, for example, for both flat and pre-angled configurations.
Figure 4:
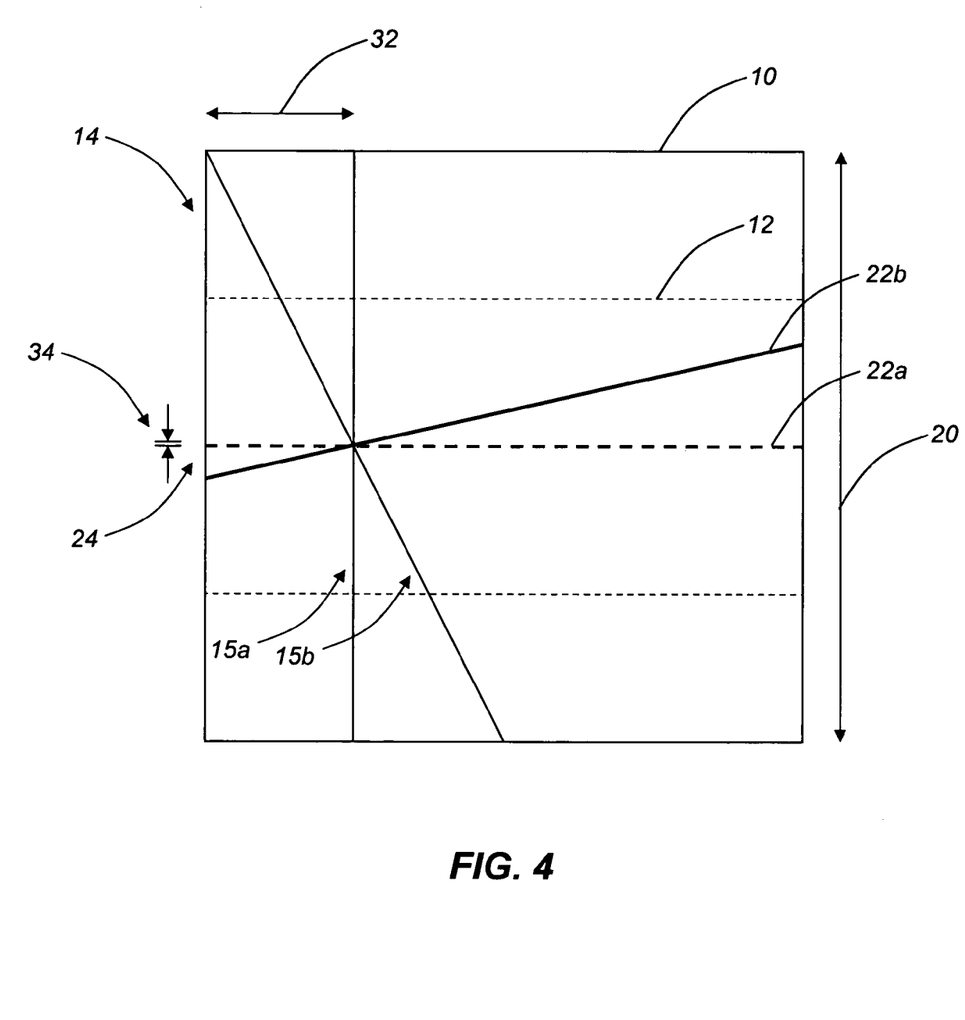
FIG. 4 is a cross-sectional side view of another illustrative MF ferrule that includes a single guide pin hole and a single optical fiber hole, illustrating the exploitation of the lateral offset change of the optical fiber hole that occurs during the polishing process, for example, for both flat and pre-angled configurations.

This is shown in FIG. 3, which illustrates an illustrative MF ferrule 10 including a single guide pin hole 12 and a single optical fiber hole 22 (specifically, an ideal, non-angled optical fiber hole 22a and an actual, angled optical fiber hole 22b). Prior to polishing, for example, both the ideal, non-angled optical fiber hole 22a and the actual, angled optical fiber hole 22b intersect the endface 14 of the MF ferrule 10 at the target location 24, for example. However, subsequent to polishing, for example, and the removal of a predetermined amount of optical fiber and ferrule materials 32, the lateral offset 34 between the ideal, non-angled optical fiber hole 22a and the actual, angled optical fiber hole 22b at the resulting endface 15 (flat 15a or pre-angled 15b) of the MF ferrule 10 has a given X-component, Y-component, and, therefore, radial component.

Referring again to FIG. 2, the distance of each of the optical fiber holes 22 from the target location 24 of each of the optical fiber holes 22 along the X-axis 18 (FIG. 1) and Y-axis 20 (FIG. 1) represents the observed X-offset 26 and Y-offset 28 of each of the optical fiber holes 22, respectively. The observed X-offset 26 and Y-offset 28 are again used to calculate the radial offset 30 of the corresponding optical fiber hole 22, indicating where the optical fiber hole 22 actually is in relation to where it should be. This subsequent radial offset 30 is calculated for each of the optical fiber holes 22. The optical fiber hole 22 with the greatest radial offset 30 again establishes the RMAX. RMAX is used to determine whether a given MF ferrule 10 (FIG. 1) is subsequently within or outside of specification with respect to optical fiber hole location. Other specifications must be met as well, including guide pin hole location, hole diameter, etc.

The method of manufacture described above and below takes advantage of this lateral offset change, as it is used to determine the angle of the actual, angled optical fiber hole 22b. Once this angle is determined, the predetermined amount of optical fiber and ferrule materials 32 removed may be selected such that the lateral offset 34 is minimized (or optimized) as described below. In practice, these methods of manufacture are applied across the plurality of optical fiber holes 22 associated with the MF ferrule 10, with the predetermined amount of optical fiber and ferrule materials 32 removed being selected such that the overall or average lateral offset 34 is minimized (or optimized). The methods of manufacture are applied across a group or lot of similarly-situated MF ferrules 10, all having similarly-angled optical fiber holes 22. Thus, one measure-polish-measure test is used to determine the angle of the actual, angled optical fiber hole(s) 22b and the optimal amount of optical fiber and ferrule materials 32 to be removed. This optimal amount of optical fiber and ferrule materials 32 to be removed is then applied to all MF ferrules 10 in the group or lot of similarly-situated MF ferrules 10.

This is shown in FIG. 4, which again illustrates an illustrative MF ferrule 10 including a single guide pin hole 12 and a single optical fiber hole 22 (specifically, an ideal, non-angled optical fiber hole 22a and an actual, angled optical fiber hole 22b). Prior to polishing, for example, the ideal, non-angled optical fiber hole 22a and the actual, angled optical fiber hole 22b intersect the endface 14 of the MF ferrule 10 at different locations, for example. However, subsequent to polishing, for example, and the removal of the predetermined amount of optical fiber and ferrule materials 32 determined using this prior knowledge of the angle of the optical fiber hole(s) 22b, the lateral offset 34 between the ideal, non-angled optical fiber hole 22a and the actual, angled optical fiber hole 22b at the resulting endface 15 (flat 15a or pre-angled 15b) of the MF ferrule 10 has a zero X-component, Y-component, and, therefore, radial component.

Therefore, the methods of manufacture of the present invention control the location of the plurality of optical fiber holes 22 as optical fiber and ferrule materials 32 are removed from the endface 14 of the MF ferrule 10. This is especially important with respect to MF ferrules 10 having pre-angled endfaces 14 due to the fact that, if the plurality of optical fiber holes 22 are "moving" in the wrong direction relative to the 8-degree angle, the insertion loss is unacceptably high. In addition, such MF ferrules 10 typically shear when assembled, contributing to even greater insertion loss. For MF ferrules 10 having pre-angled endfaces 14, performance improvement may be a relatively simple matter of determining in which direction the MF ferrules 10 are loaded in the polishing jig, for example, as the MF ferrules 10 will be polished at the 8-degree angle.

Figure 5:
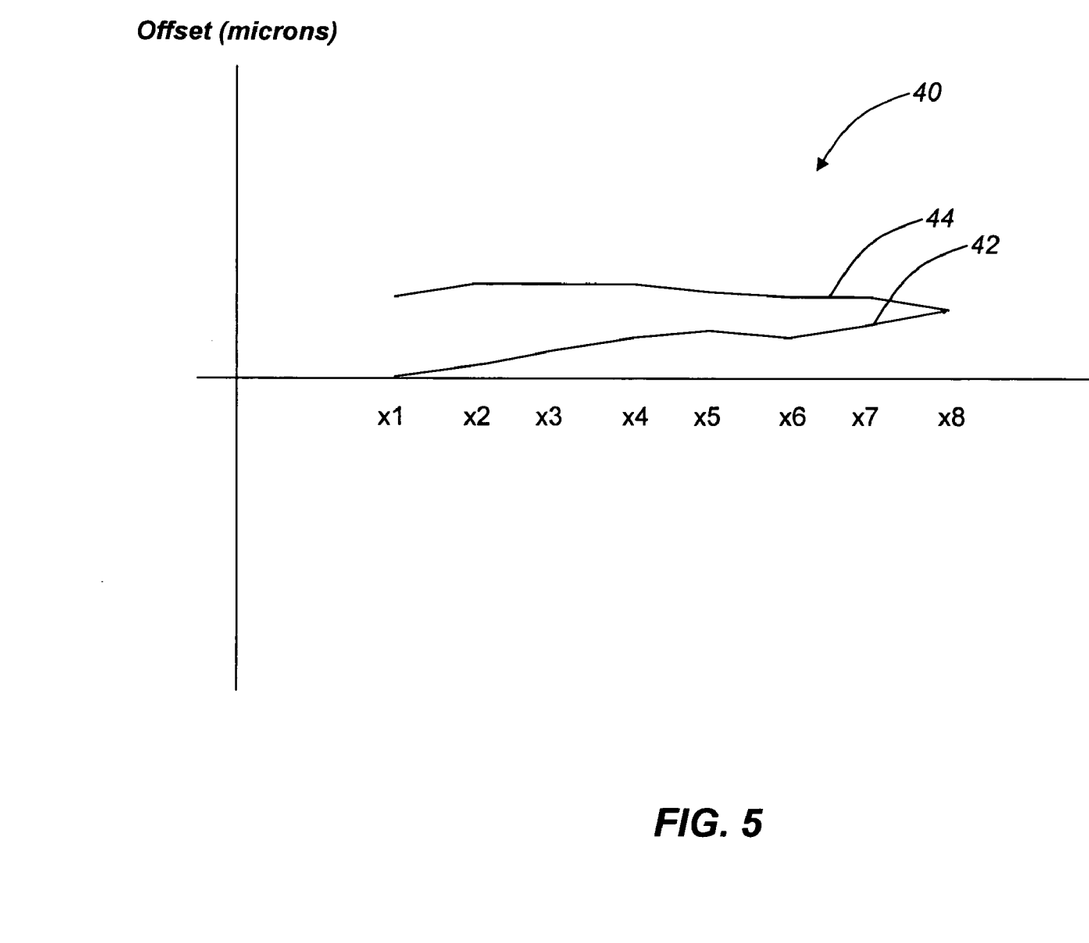
FIG. 5 is a plot illustrating the X-offset of an 8f MF ferrule both before polishing in a flat endface configuration and after polishing in an angled endface configuration.

FIG. 5 illustrates the X-offset 40 of an 8f MF ferrule both before polishing in a flat endface configuration 42 and after polishing in an angled endface configuration 44.

Figure 6:
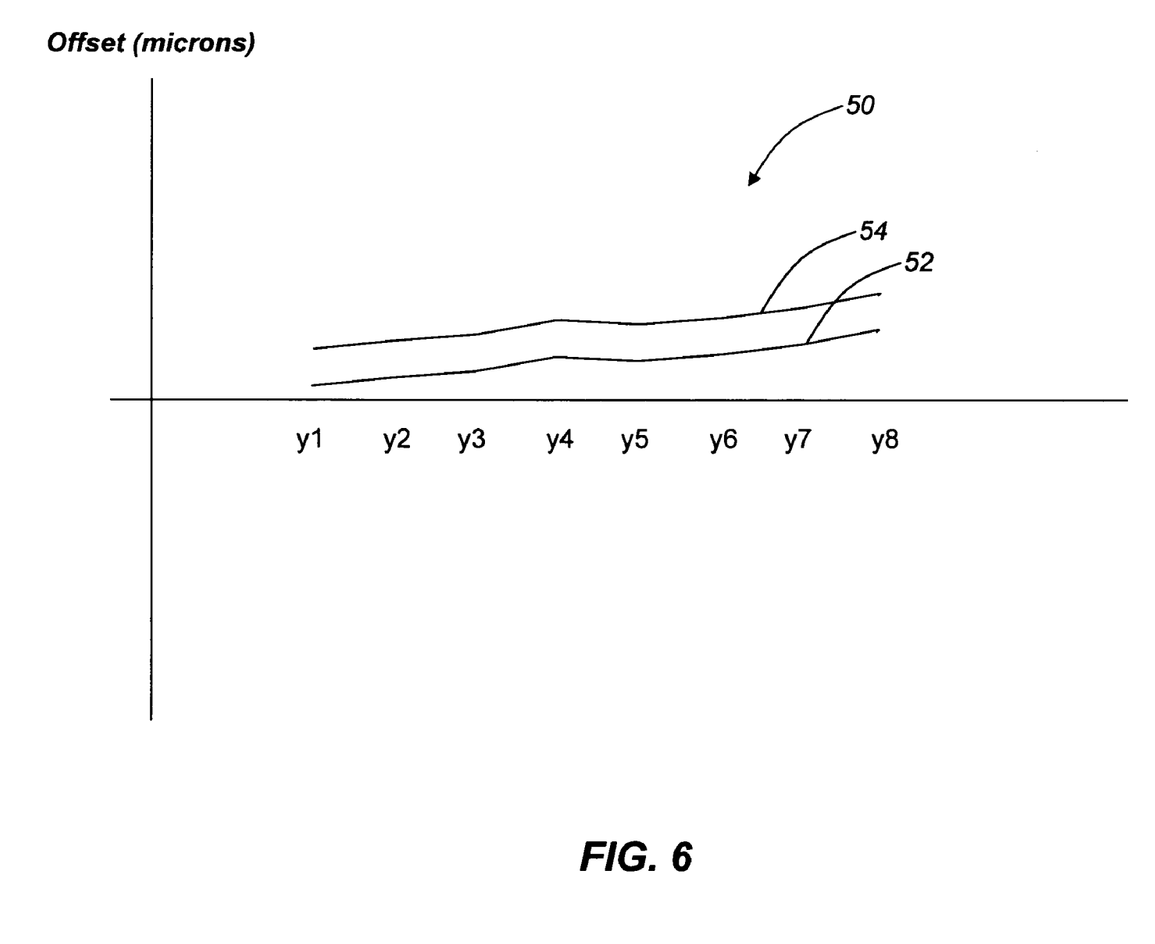
FIG. 6 is a plot illustrating the Y-offset of the 8f MF ferrule both before polishing in the flat endface configuration and after polishing in the angled endface configuration.

FIG. 6 illustrates the Y-offset 50 of the 8f MF ferrule both before polishing in the flat endface configuration 52 and after polishing in the angled endface configuration 54.

Figure 7:
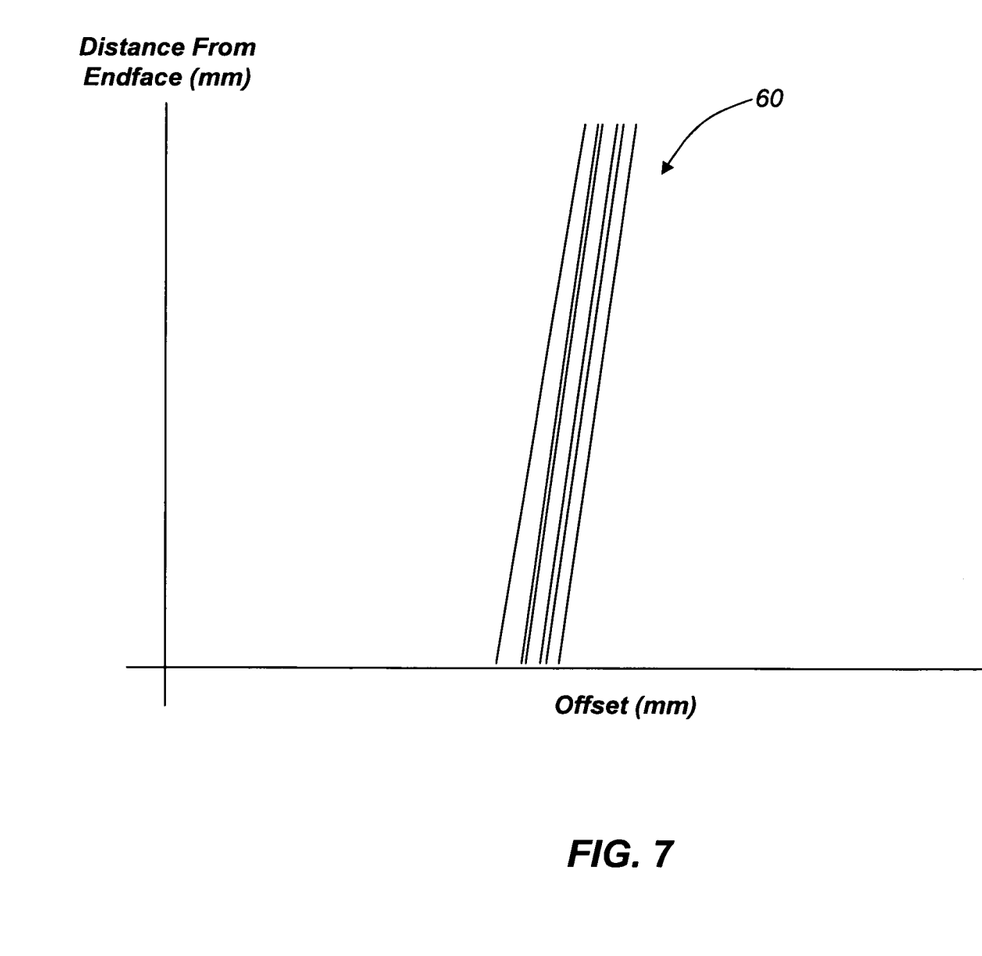
FIG. 7 is a plot illustrating the X-pinbending offsets from nominal as a function of the distance from the endface.
Figure 8:
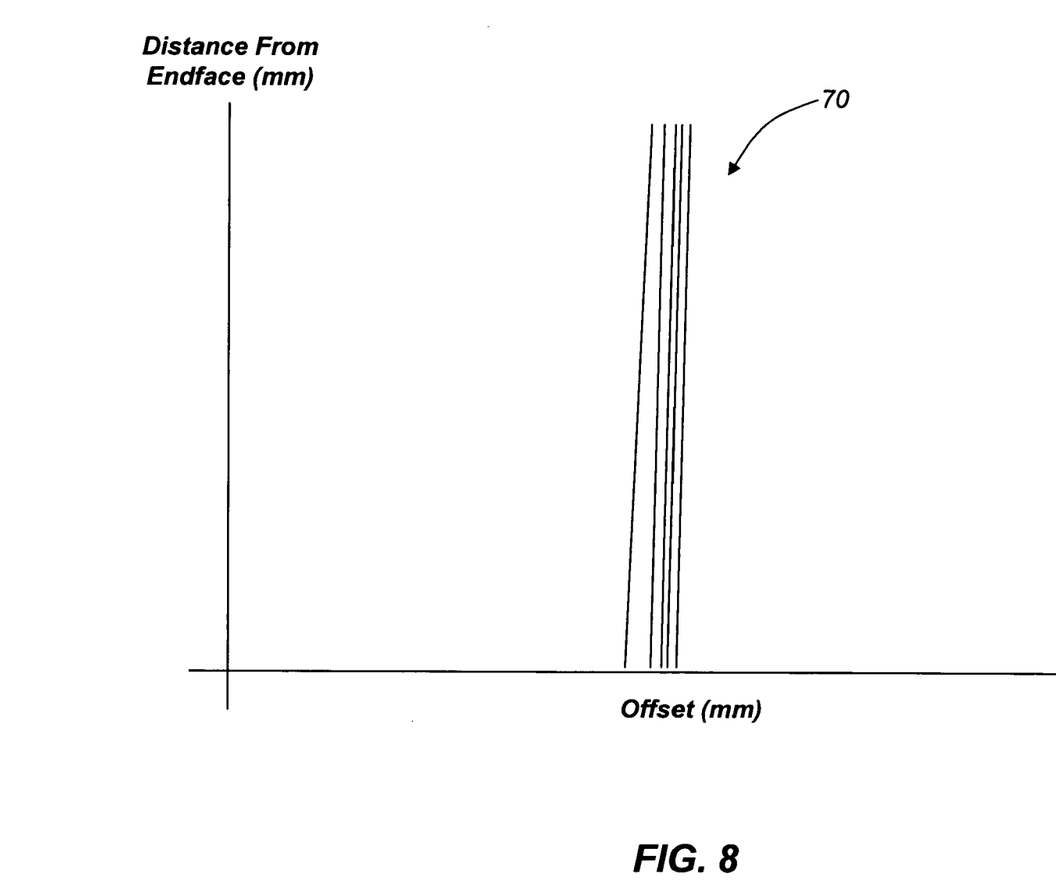
FIG. 8 is a plot illustrating the Y-pinbending offsets from nominal as a function of the distance from the endface.

FIG. 7 illustrates the X-pinbending offsets from nominal 60 as a function of the distance from the endface. FIG. 8 illustrates the Y-pinbending offsets from nominal 70 as a function of the distance from the endface.

As an illustrative example, the process for tuning the Y-component of the plurality of optical fiber holes of an MF ferrule includes measuring the Y-component locations of each of the optical fiber holes on the endface of the MF ferrule. 50 μm of optical fiber and ferrule materials are then polished from the endface of the MF ferrule. The Y-component of each of the optical fiber holes of the MF ferrule are again measured on the resulting endface of the MF ferrule. Using this data, the angle of each of the optical fiber holes is determined, i.e. the degree and direction of Y-component movement is determined for each of the optical fiber holes. An optimal polishing depth is then selected, and this optimal polishing depth is applied to all similarly-situated MF ferrules in the group or lot. Thus, insertion loss is minimized for the group or lot. It should be noted that part of this optimization process may include compensating for shear.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method of manufacture that minimizes the lateral offset of a plurality of optical fiber holes associated with a multi-fiber ferrule, comprising:
    determining an initial offset distance of an optical fiber hole from a target location in one or more directions on an initial endface of a multi-fiber ferrule;
    removing a predetermined amount of material from the multi-fiber ferrule to form a subsequent endface of the multi-fiber ferrule;
    determining a subsequent offset distance of the optical fiber hole from the target location in the one or more directions on the subsequent endface of the multi-fiber ferrule; and
    using the initial offset distance of the optical fiber hole and the subsequent offset distance of the optical fiber hole, determining an angle of the optical fiber hole relative to the initial endface of the multi-fiber ferrule.

2. The method of manufacture of claim 1, further comprising:
    using the angle of the optical fiber hole, determining an optimal amount of material that is removed from the multi-fiber ferrule in order to minimize the offset distance of the optical fiber hole from the target location.

3. The method of manufacture of claim 2, further comprising:
    using the optimal amount of material that is removed from the multi-fiber ferrule, removing this amount of material from another similarly-situated multi-fiber ferrule.

4. The method of manufacture of claim 1, wherein the multi-fiber ferrule has one of a flat endface and a pre-angled endface.

5. The method of manufacture of claim 1, wherein the method of manufacture is used to minimize insertion loss.

6. The method of manufacture of claim 1, wherein the method of manufacture is used to compensate for shear.

7. A method of manufacture that minimizes the lateral offset of a plurality of optical fiber holes associated with a multi-fiber ferrule, comprising:

determining an initial offset distance of each of a plurality of optical fiber holes from each of a plurality of corresponding target locations in one or more directions on an initial endface of a multi-fiber ferrule;

removing a predetermined amount of material from the multi-fiber ferrule to form a subsequent endface of the multi-fiber ferrule;

determining a subsequent offset distance of each of the plurality of optical fiber holes from each of the plurality of corresponding target locations in the one or more directions on the subsequent endface of the multi-fiber ferrule; and using the initial offset distance of each of the plurality of optical fiber holes and the subsequent offset distance of each of the plurality of optical fiber holes, determining an angle of each of the plurality of optical fiber holes relative to the initial endface of the multi-fiber ferrule.

8. The method of manufacture of claim 7, further comprising:

using the angle of each of the plurality of optical fiber holes, determining an optimal amount of material that is removed from the multi-fiber ferrule in order to minimize the offset distance of the plurality of optical fiber holes from the plurality of corresponding target locations.

9. The method of manufacture of claim 8, further comprising:

using the optimal amount of material that is removed from the multi-fiber ferrule, removing this amount of material from another similarly-situated multi-fiber ferrule.

10. The method of manufacture of claim 7, wherein the multi-fiber ferrule has one of a flat endface and a pre-angled endface.

11. The method of manufacture of claim 7, wherein the method of manufacture is used to minimize insertion loss.

12. The method of manufacture of claim 7, wherein the method of manufacture is used to compensate for shear.

13. A multi-fiber ferrule formed by a method of manufacture, comprising:

determining an initial offset distance of an optical fiber hole from a target location in one or more directions on an initial endface of a test multi-fiber ferrule;

removing a predetermined amount of material from the test multi-fiber ferrule to form a subsequent endface of the test multi-fiber ferrule;

determining a subsequent offset distance of the optical fiber hole from the target location in the one or more directions on the subsequent endface of the test multi-fiber ferrule; and using the initial offset distance of the optical fiber hole and the subsequent offset distance of the optical fiber hole, determining an angle of the optical fiber hole relative to the initial endface of the test multi-fiber ferrule.

14. The multi-fiber ferrule formed by the method of manufacture of claim 13, further comprising:

using the angle of the optical fiber hole, determining an optimal amount of material that is removed from the multi-fiber ferrule in order to minimize the offset distance of the optical fiber hole from the target location.

15. The multi-fiber ferrule formed by the method of manufacture of claim 14, further comprising:

using the optimal amount of material that is removed from the multi-fiber ferrule, removing this amount of material from the multi-fiber ferrule.

16. The multi-fiber ferrule formed by the method of manufacture of claim 13, wherein the multi-fiber ferrule has one of a flat endface and a pre-angled endface.

17. The multi-fiber ferrule formed by the method of manufacture of claim 13, wherein the method of manufacture is used to minimize insertion loss.

18. The multi-fiber ferrule formed by the method of manufacture of claim 13, wherein the method of manufacture is used to compensate for shear.

* * * * *